Aug. 17, 1948.   D. E. BENNETT   2,447,225
EMERGENCY WHEEL
Filed Aug. 6, 1945
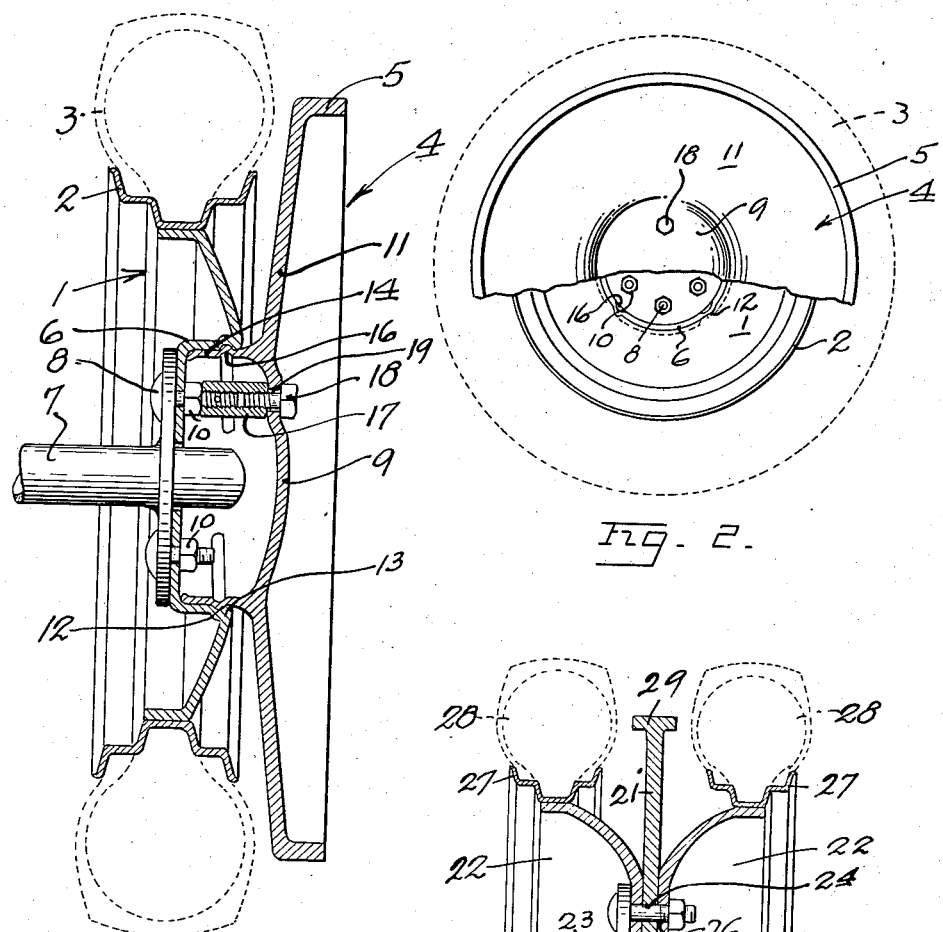
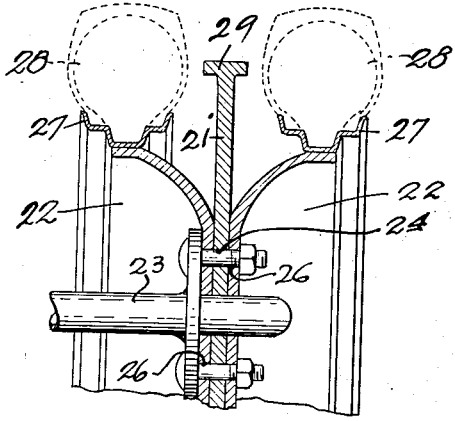
Fig. 1.
Fig. 2.
Fig. 3.
INVENTOR.
DONALD E. BENNETT
BY George B. White
ATTORNEY Patented Aug. 17, 1948

2,447,225

UNITED STATES PATENT OFFICE 2,447,225

EMERGENCY WHEEL

Donald Edward Bennett, Larkspur, Calif.

Application August 6, 1945, Serial No. 609,118

1 Claim. (Cl. 301—38)

This invention relates to a safety device for tires.

An object of the invention is the provision of an auxiliary ring or wheel on the tire on which the load can be carried in the event the tire for some reason is deflated to a dangerous flatness.

Another object of the invention is to provide an auxiliary ring or support on which a wheel can rotate and carry a load after the tire of the wheel is deflated to dangerous softness.

Another object of the invention is to provide a device for pneumatic tire wheels which provides protection against any deflation beyond the danger zone of injury to the tires, and will positively eliminate injury to tires from stone bruises, curbing, or injury caused from running on a flat tire, because, irrespective of whether the flattening is caused by sudden deflation or by a slow leak, the warning of the deflation when the auxiliary wheel hits the road or curb, gives the driver time to slow down and prevent an accident before the tire becomes completely flat, or automatically warns the driver that the tire must be inflated.

A further object of the invention is to provide an auxiliary protector ring or wheel which can be readily attached to tire wheels so as to carry the load when the tire is deflated to a dangerous softness.

Another object of this invention is to provide a tire protector device which is highly useful and simple in construction. Convenience of arrangement, lightness and comparative inexpense of manufacture are further objects which have been borne in mind in the production and development of the invention.

The essential features of the invention involved in the carrying out of the objects indicated are susceptible to modification, but a preferred embodiment of the invention is shown in the accompanying drawings, in which:

Fig. 1 is a sectional view of a tire wheel with my protector device in position on the same.

Fig. 2 is a partly fragmental side view of the wheel and the device, and

Fig. 3 is a fragmental sectional view of a modified embodiment of my protector device for use in connection with double wheels.

In Fig. 1 I show a wheel 1 on the rim 2 of which is mounted a usual pneumatic tire 3. The average tire used on automobiles at the present is depressed several inches radially under the load it carries. When the tire is properly inflated it can stand the stress of such compression without cuts, bruises or breakage of the fabric.

When, however, a tire is, for any reason, deflated to such a softness that under compression the tire is flattened closer to the tire rim, then the compression of the tire to the usual several inches would damage the tire. To prevent such injury to the tire I provide a ring or auxiliary wheel 4 which is suitably mounted on the wheel 1 so that the outer periphery or bearing flange 5 of the ring 4 is spaced from the inflated outer periphery of the tire 3 to a radial distance substantially equal to the dangerous zone of deflation of said tire 3. The ring flange 5 is spaced to one side of the tire 3. In the wheel 1 is formed the usual hollow hub 6 which is mounted on the axle 7 by suitable bolts 8 and nuts 10. It is preferable that the auxiliary wheel 4 be mounted on the hub 6.

In the illustrative embodiment shown in Figs. 1 and 2 the auxiliary wheel 4 has a central hub which forms a hub cap 9 for the hub 6 of the usual wheel 1. The disc or spokes 11 which connect the flange 5 to the hub cap 9 are preferably inclined radially outwardly and away from the wheel 1 so as to properly space the flange 5 of the auxiliary wheel 4 from the side of the tire 3. It is to be noted that the diameter of the warning or supporting flange 5 of the auxiliary wheel 4 extends to slightly above the middle of the side wall of the tire 3, so that when the tire 3 is deflated and under the load is compressed or flattened to about the diameter of the flange 5, the said flange 5 will touch the road or surface and give warning to the driver that the tire is dangerously deflated.

The outward spacing of the flange 5 is such that in the event of driving into a curb or a large stone, the flange 5 will hit the curb or stone and will shield the tire from injury, at the same time warning the driver.

In the illustrative embodiment herein the wheel hub 6 is provided with internal quarter threads 12 near the outer edge 13 of the hollow hub 6. The hub cap 9 of the auxiliary wheel 4 is provided with a cylindrical hub cap flange 14 which fits into the interior of the hollow hub 6. On this cylindrical hub cap flange 14 are provided threaded projections 16 which are arranged as male quarter threads fitting into the female quarter threads 12 of the hub 6. The predetermined turning of the auxiliary wheel 4 for this threaded engagement with the hollow hub 6 will tend to locate the auxiliary wheel 4 and its hub cap 9 always in the same position relatively to the bolt 8 in the hollow hub 6.

The auxiliary wheel 4 is prevented from accidental turning, in this illustration, by the use of a sleeve nut 17. This sleeve nut 17 is threaded throughout its interior length and into the outer end of the sleeve nut 17 is secured a bolt or screw 18 which latter is extended through a hole 19 in the hub cap 9.

In assembling the auxiliary wheel 4 on the wheel 1, the hub cap 9 is secured into the hub 6 similarly to the operation of securing a usual hub cap on a hub. In this instance the wheel 4 is so located that the hole 19 is about quarter turn away from the connecting bolt 8 in the hub 6. Then as the hub cap 9 is turned a quarter of a revolution, it is to be secured in place and the hole 19 will be aligned with its bolt 8. The sleeve nut 17 is placed on the bolt 8 prior to the assembly of the auxiliary wheel 4, so that the hole 19 will be aligned with the sleeve nut 17. Then by inserting the bolt 18 from the outside through the hole 19 into the sleeve nut 17, the accidental rotation of the hub cap 9 and the auxiliary wheel 4 is prevented.

The illustrative embodiment shown in Fig. 3 includes an auxiliary wheel 21 mounted between double wheels 22 on the axle 23. In this form the auxiliary wheel 21 has a plurality of holes 24 therein corresponding to the usual bolt holes 26 in the hubs of the double wheels 22 so that the auxiliary wheel 21 is bolted in place together with the double wheels 22. The properly spaced rims 27 of the double wheels 22 support spaced pneumatic tires 28. The auxiliary wheel 21 extends outwardly between the tires 28 and has on its outer periphery a bearing flange 29 spaced from the sides and from the outer peripheries of the tires 28 to a distance corresponding to the dangerous condtion of flatness of said tires.

In my invention the auxiliary wheel 4 in its first form fully protects against stone bruises, rim cuts or breaking of the fabric on account of deflation of tires beyond the predetermined danger zone. Both forms of the invention provide for warning to the driver of such flatness when the flanges of the auxiliary wheels touch the road. The auxiliary wheels also provide protection for riding on the auxiliary wheel when the tire is flat because it prevents the flattening of the tire against the usual tire wheel and carries the load on the auxiliary wheel. The first form also provides for protection against injury to the tire when the wheel is bumped or driven into a curb. The auxiliary wheel of my construction is easily installed and it positively operates without need for any adjustment or any unusual operation. It is simple in construction and it is eminently adapted for the purposes herein stated.

I claim:

The combination with a tire wheel having a pneumatic tire mounted on its rim and having a hollow wheel hub; of an auxiliary wheel comprising a hub cap fitting over the hollow hub of said wheel, an annular flange, an auxiliary wheel body connecting said flange to said hub cap and spacing said flange outwardly from the side of the tire and radially inwardly from the periphery of said tire, said hub cap being hollow, threaded connecting means between said hub cap and said hub for securing said hub cap and hub together upon a predetermined degree of turning of said hub cap in said hub, said hub cap having a hole therethrough, and means extending through said hole and connected to said hub to prevent the rotation of said hub cap relatively to said hub.

DONALD EDWARD BENNETT.

REFERENCES CITED

The following references are of record in the file of this patent:

UNITED STATES PATENTS

| Number | Name | Date |
| --- | --- | --- |
| 1,311,119 | Goldsmith | July 22, 1919 |
| 2,054,225 | Lewis | Sept. 15, 1936 |
| 2,336,959 | Redman | Dec. 14, 1943 |

FOREIGN PATENTS

| Number | Country | Date |
| --- | --- | --- |
| 17,803 | Great Britain | 1914 |